US012663548B2

(12) United States Patent
Chen et al.

(10) Patent No.: US 12,663,548 B2
(45) Date of Patent: Jun. 23, 2026

(54) POSITIONING METHOD, DEVICE, ELECTRONIC EQUIPMENT AND STORAGE MEDIUM

(71) Applicant: BEIJING XIAOMI MOBILE SOFTWARE CO., LTD., Beijing (CN)

(72) Inventors: Chongwei Chen, Beijing (CN); Xue Fu, Beijing (CN); Kongpeng Xing, Beijing (CN); Yucheng Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 350 days.

(21) Appl. No.: 17/877,841

(22) Filed: Jul. 29, 2022

(65) Prior Publication Data

US 2023/0296789 A1 Sep. 21, 2023

(30) Foreign Application Priority Data

Mar. 15, 2022 (CN) .......................... 202210254159.0

(51) Int. Cl.
G01S 19/25 (2010.01)
G01S 19/08 (2010.01)
H04B 7/185 (2006.01)

(52) U.S. Cl.
CPC ............ G01S 19/258 (2013.01); G01S 19/08 (2013.01); H04B 7/18545 (2013.01)

(58) Field of Classification Search
CPC ........ G01S 19/258; G01S 19/08; G01S 19/21; G01S 19/20; G01S 19/396; G01S 19/43; H04B 7/18545

USPC ............... 342/357.2, 357.45, 357.26, 357.59
See application file for complete search history.

(56) References Cited

U.S. PATENT DOCUMENTS

| | | | | | |
|---|---|---|---|---|---|
| 5,373,298 | A | * | 12/1994 | Karouby | ................. G01S 19/39 455/12.1 |
| 5,446,465 | A | * | 8/1995 | Diefes | ....................... G01S 3/48 342/357.34 |
| 5,448,773 | A | * | 9/1995 | McBurney | .............. G01S 19/34 455/12.1 |
| 6,377,891 | B1 | * | 4/2002 | Gilbert | .................... G01S 19/13 342/357.29 |

(Continued)

FOREIGN PATENT DOCUMENTS

| | | |
|---|---|---|
| CN | 105891852 A | 8/2016 |
| CN | 106855627 A | 6/2017 |
| CN | 108156650 A | 6/2018 |

OTHER PUBLICATIONS

Extended European Search Report issued in Application No. 22187905. 9, dated Apr. 13, 2023,(9p).

(Continued)

*Primary Examiner* — Michael W Justice
(74) *Attorney, Agent, or Firm* — Arch & Lake LLP; Hao Tan; Shen Wang

(57) ABSTRACT

A positioning method may include: receiving a positioning signal of at least one constellation; determining a quality parameter of each constellation of the at least one constellation correspondingly based on the positioning signal of the at least one constellation; controlling a terminal equipment to stop receiving the positioning signal of the constellation of the at least one constellation, where the quality parameter of the constellation meets a preset condition.

18 Claims, 2 Drawing Sheets

Receiving positioning signals of at least one constellation — S101

Determining quality parameters of each constellation of the at least one constellation correspondingly based on the positioning signals of the at least one constellation — S102 controlling the terminal equipment to stop receiving the positioning signals transmitted by the constellation of the at least one constellation, wherein the quality parameters of the constellation meet preset conditions — S103

(56) References Cited

U.S. PATENT DOCUMENTS

| | | | | |
|---|---|---|---|---|
| 6,441,780 | B1 * | 8/2002 | Rog | G01S 19/33 |
| | | | | 342/357.73 |
| 6,441,781 | B1 * | 8/2002 | Rog | G01S 19/29 |
| | | | | 342/357.73 |
| 6,915,210 | B2 * | 7/2005 | Longhurst | G01S 19/072 |
| | | | | 701/484 |
| 8,922,421 | B2 * | 12/2014 | Pomietlasz | G01S 13/87 |
| | | | | 342/368 |
| 9,411,051 | B2 * | 8/2016 | Sagiraju | G01S 19/28 |
| 10,139,234 | B2 * | 11/2018 | Matthews | G05D 1/0278 |
| 11,300,689 | B2 * | 4/2022 | Noble | G01S 19/49 |
| 11,320,541 | B1 * | 5/2022 | Cattaneo | H04W 12/30 |
| 2005/0015200 | A1 * | 1/2005 | Longhurst | G01S 19/072 |
| | | | | 701/469 |
| 2012/0188125 | A1 * | 7/2012 | Pomietlasz | G01S 13/87 |
| | | | | 342/357.68 |
| 2013/0162468 | A1 * | 6/2013 | Kim | G01S 19/425 |
| | | | | 342/357.25 |
| 2014/0354476 | A1 * | 12/2014 | Sagiraju | G01S 19/28 |
| | | | | 342/357.67 |
| 2014/0368379 | A1 * | 12/2014 | Lennen | G01S 19/33 |
| | | | | 342/357.73 |
| 2015/0071041 | A1 * | 3/2015 | Akiyama | G04R 20/04 |
| | | | | 368/47 |
| 2016/0258759 | A1 * | 9/2016 | Matthews | G01S 19/14 |
| 2016/0349377 | A1 * | 12/2016 | Jarmuszewski | G01S 19/34 |
| 2020/0191976 | A1 * | 6/2020 | Wu | G01S 19/22 |
| 2021/0255336 | A1 * | 8/2021 | Noble | G01S 19/49 |
| 2022/0128704 | A1 * | 4/2022 | Cattaneo | G01S 19/03 |

OTHER PUBLICATIONS

First Office Action issued to Chinese Application No. 202210254159.0 dated Sep. 19, 2024 with English translation, (15p).

* cited by examiner

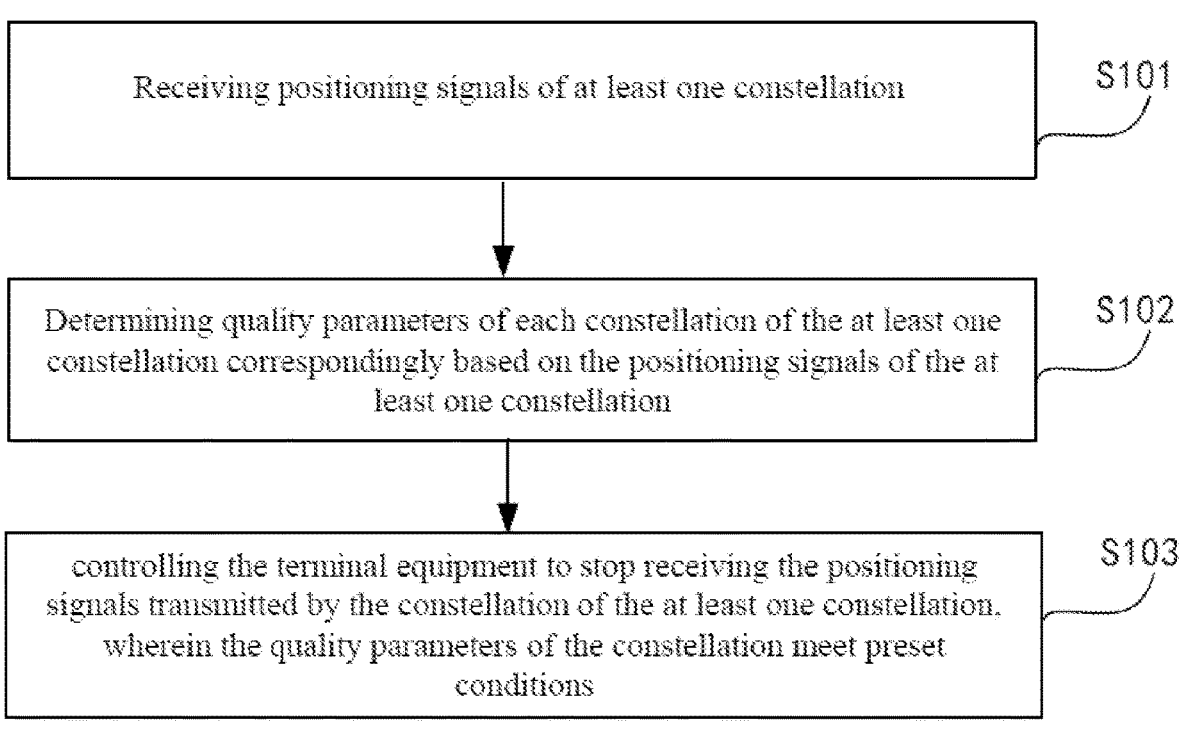

Receiving positioning signals of at least one constellation ⟶ S101

Determining quality parameters of each constellation of the at least one constellation correspondingly based on the positioning signals of the at least one constellation ⟶ S102 controlling the terminal equipment to stop receiving the positioning signals transmitted by the constellation of the at least one constellation, wherein the quality parameters of the constellation meet preset conditions ⟶ S103

FIG.1

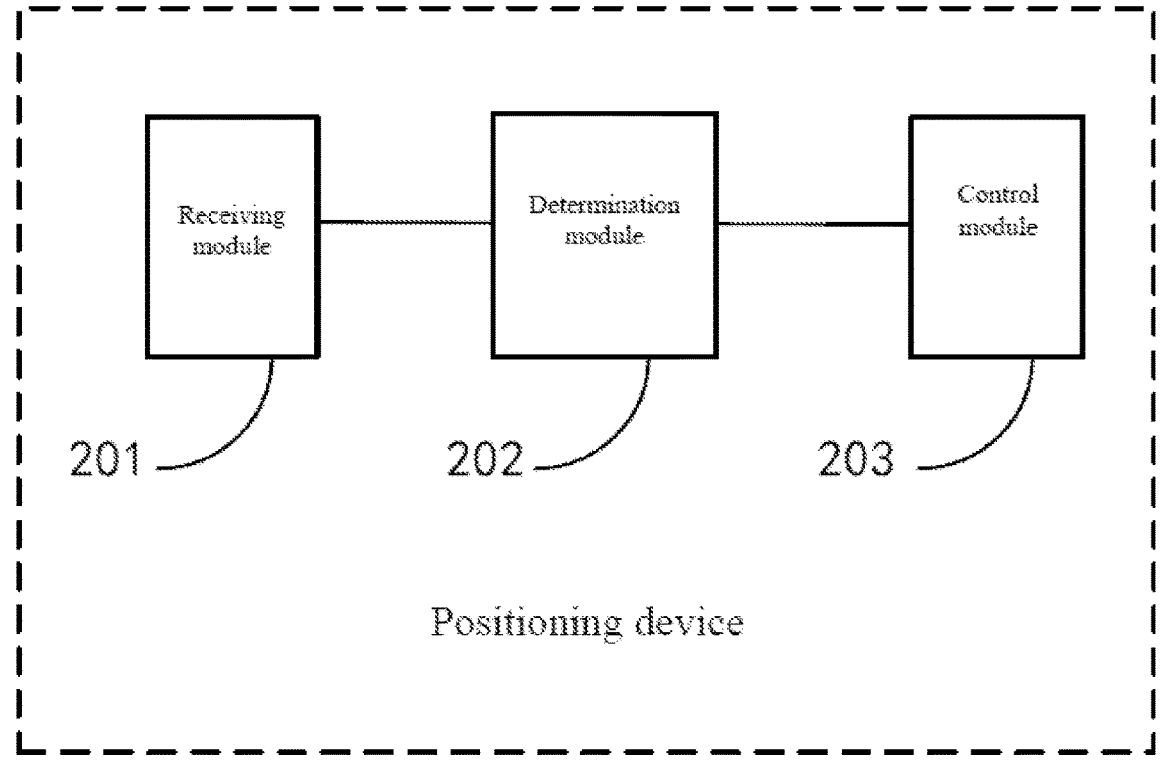

Receiving module        Determination module        Control module 201        202        203

Positioning device

FIG.2

POSITIONING METHOD, DEVICE, ELECTRONIC EQUIPMENT AND STORAGE MEDIUM

CROSS-REFERENCE TO RELATED APPLICATIONS

The present application claims the priority to Chinese Application NO. 202210254159.0 filed on Mar. 15, 2022, the entire content of which is incorporated herein by reference for all purposes.

TECHNICAL FIELD

The present disclosure relates to the field of positioning technology, in particular to a positioning method, a device, an electronic equipment and a storage medium.

BACKGROUND

In recent years, the functions of terminal equipment have become more and more abundant. The realization of these functions needs to rely on the underlying services of the terminal equipment, such as the positioning services of the terminal equipment. When the terminal equipment performs the positioning service, the positioning signal of satellites may be received through the antenna, and then the position of the terminal equipment is calculated based on these positioning signals, so as to complete the positioning.

SUMMARY

The present disclosure provides a positioning method, a device, an electronic equipment and a storage medium.

According to a first aspect of the present disclosure, provided is a positioning method applied to a terminal equipment, including:

receiving a positioning signal of at least one constellation;

determining a quality parameter of each constellation of the at least one constellation correspondingly based on the positioning signal of the at least one constellation;

controlling the terminal equipment to stop receiving the positioning signal transmitted by a constellation, among the at least one constellation, with the quality parameter of the constellation meeting a preset condition.

According to a second aspect of the present disclosure, provided is an electronic equipment including a memory and a processor; where, the memory is configured to store computer instructions runnable on the processor; the processor is configured to execute the computer instructions based on the positioning method described in the first aspect.

According to a third aspect of the present disclosure, provided is a non-transitory computer readable storage medium on which computer programs are stored, where, the method described in the first aspect is implemented when the programs are executed by a processor.

BRIEF DESCRIPTION OF THE DRAWINGS

The drawings herein are incorporated into and form a part of the description, showing embodiments in accordance with the disclosure, and are used together with the description to explain the principles of the disclosure.

FIG. 1 is a flowchart of a positioning method illustrated in an example of the present disclosure;

FIG. 2 is a structural diagram of a positioning device shown in an example of the present disclosure;

DETAILED DESCRIPTION

Figure 3:
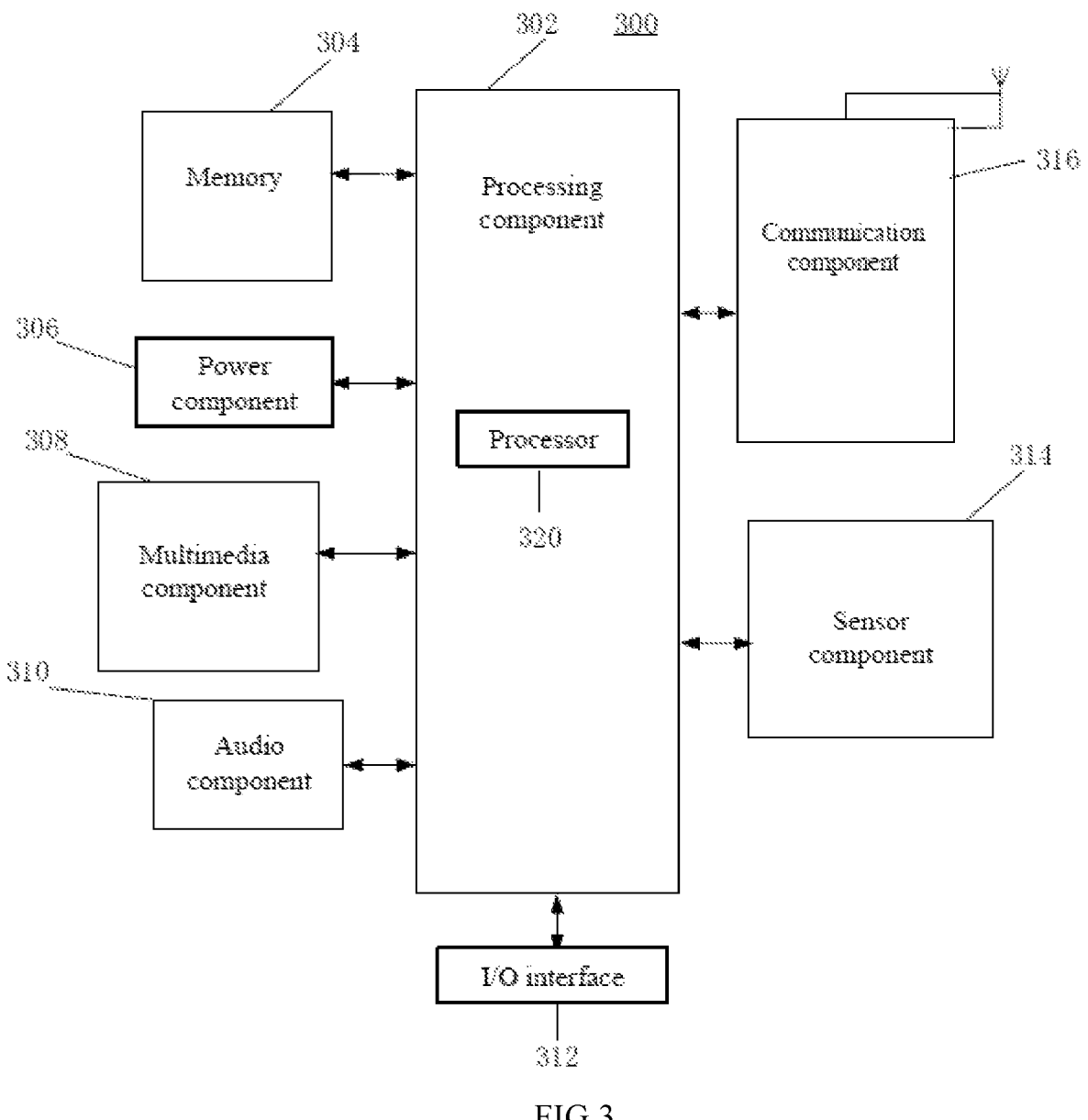
FIG. 3 is a structural block diagram of an electronic equipment illustrated in an example of the present disclosure.

Embodiments will be described herein in detail, and an example of which is shown in the drawings. When the following description relates to the drawings, unless otherwise indicated, the same numbers in different drawings represent the same or similar elements. The embodiments described in the following embodiments do not represent all embodiments consistent with the present disclosure. Instead, they are merely examples of devices and methods consistent with some aspects of the present disclosure as detailed in the appended claims.

The terms used in the present disclosure are for the purpose of describing specific embodiments and are not intended to limit the present disclosure. The singular forms "one", "the" and "this" used in the present disclosure and the appended claims are also intended to include the majority forms, unless the context clearly indicates other meanings. It may also be understood that the term "and/or" as used herein refers to and includes any or all possible combinations of one or more associated listed items.

It may be understood that although the terms first, second, third, and the like may be used in the present disclosure to describe various information, such information may not be limited to these terms. These terms are used to distinguish the same type of information from each other. For example, without departing from the scope of the present disclosure, the first information may also be referred to as the second information, and similarly, the second information may also be referred to as the first information. Depending on the context, the word "if" as used herein may be interpreted as "in condition that" or "when" or "in response to determination".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

At present, the GNSS (Global Navigation Satellite System) satellite positioning and navigation function on terminal equipment has become one of the most commonly used functions by users. GNSS satellite positioning system is widely used on terminal equipment, bringing more convenient and fast space location assistance experience to the public. GNSS satellite positioning is to receive satellite signals through terminal equipment, calculate the distance between itself and a plurality of satellites, and then calculate the longitude, latitude and altitude information of itself based on the principle of triangular positioning. Users may open the GNSS satellite positioning service via the setting interface on the terminal equipment, and then view their location information and surrounding street information in real time by means of commercial map software, and set the destination to obtain the specific route and time estimation.

At present, GNSS satellite positioning service on terminal equipment generally supports a plurality of satellite frequency bands (such as 11/15 dual frequency bands) and a plurality of constellations (such as GPS (Global Positioning System), BDS (BDS navigation satellite system), GLONASS (Global Navigation Satellite System) Galileo (Galileo satellite navigation system), NAVIC (Indian regional navigation satellite system), etc.). Therefore, during the positioning process, the terminal equipment needs to search the positioning signal of satellites frequently, and searching for the positioning signal consumes more power, which will cause a larger power consumption of the terminal equipment and affect the endurance and use of the terminal equipment. For example, when the mobile phone is used for positioning, the equipment will scan a plurality of groups of signal frequencies at the same time, so as to receive more satellite signal data in a short time to achieve positioning. In this process, more power is consumed. However, the terminal equipment is limited by its design size and has no larger space to store battery devices. Therefore, when the terminal equipment uses the positioning function, it will consume a large amount of power, thus greatly reducing the endurance time of the equipment. According to statistics, GNSS positioning function is a major power consumer on mobile phones. When this function is enabled, it will occupy about 30% of the power consumption of the terminal equipment on average.

Based on this, in the first aspect, at least one embodiment of the present disclosure provides a positioning method. Referring to FIG. 1, the flow of the method, including step S101 and step S103, is shown.

The method is applied to the terminal equipment supporting GNSS satellite positioning service. The terminal equipment may be user equipment (UE), mobile devices, user terminals, terminals, cellular phones, cordless phones, personal digital assistant (PDA) handheld devices, computing devices, on-board devices, wearable devices, etc.

This method may be applied to the scenarios where the terminal equipment performs GNSS positioning, such as the scenarios where the user performs positioning, path planning, real-time navigation via the mobile phone.

In step S101, positioning signal of at least one constellation is received.

Among them, the GNSS receiving chip of the terminal equipment may scan, receive and process the positioning signal of a plurality of constellations, such as GPS, BDS, GLONASS, Galileo, NAVIC, etc. Each constellation has a plurality of satellites.

At least one constellation mentioned in this step may be the all constellations supported by the positioning service of the terminal equipment. Alternatively, at least one constellation mentioned in this step may be part of the all constellations supported by the positioning service of the terminal equipment. For example, the positioning service of the terminal equipment supports GPS, BDS, GLONASS, Galileo and NAVIC, and at least one constellation may be GPS, BDS and Galileo. That is, the terminal equipment does not receive the positioning signal transmitted by GLONASS and NAVIC, with the power consumption of the positioning service being reduced.

In step S102, quality parameter of each constellation in the at least one constellation is determined correspondingly based on the positioning signal of the at least one constellation.

The quality parameter may include at least one of satellite elevation, carrier to noise density (C/NO) and number of satellites. The satellite elevation may be the average satellite elevation, the median of the satellite elevation, and the maximum value of the satellite elevation, etc. That is, in this step, the average satellite elevation of each constellation may be determined; the carrier noise density value of each constellation may be determined; the number of satellites in each constellation may be determined; both the average satellite elevation of each constellation and the carrier noise density of each constellation may be determined; both the average satellite elevation of each constellation and the number of satellites in each constellation may be determined; both the carrier noise density value of each constellation and the number of satellites of each constellation may be determined; both the average satellite elevation of each constellation, the number of satellites in each constellation, and the number of satellites in each constellation may be determined.

After receiving the positioning signals of the plurality of constellations, the terminal equipment may identify each satellite to which the positioning signal belongs and the constellation to which each satellite belongs, so as to obtain the number of satellites in each constellation. Furthermore, the elevation and carrier noise density value of each satellite may be calculated for the positioning signal of each satellite. The satellite elevation refers to the included angle between the connection between the satellite and the terminal equipment and the horizon where the terminal equipment is located. The larger the satellite elevation a, the farther the satellite is from the horizon where the terminal equipment is located (from the location of the terminal equipment, the higher the height of the satellite), the less likely the signal will be blocked or interfered. On the contrary, the smaller the satellite elevation angle of the satellite, the closer the satellite is to the horizon where the terminal equipment is located (from the location of the terminal equipment, the lower the height of the satellite), the more likely the signal will be blocked or interfered. The carrier noise density value of a satellite may represent the strength of the satellite positioning signal. That is, the higher the carrier noise density value, the stronger the strength of the satellite positioning signal. The lower the carrier noise density value, the weaker the strength of the satellite positioning signal.

In one possible embodiment, the satellite elevation of the constellation may be determined in the following manner: obtaining the positioning signal of each satellite from the positioning signals of the constellation; determining the satellite elevation of each satellite correspondingly based on the positioning signal of each satellite; determining the satellite elevation of the corresponding constellation based on the satellite elevations of the plurality of satellites in the constellation.

For ease of understanding, the following embodiments take the satellite elevation of the constellation as the average satellite elevation of the constellation as an example. The average satellite elevation of the constellation refers to the average value of the satellite elevations of the plurality of satellites of the constellation. In a possible embodiment, if the satellite elevation of the constellation is the average satellite elevation, the average satellite elevation of each constellation may be determined respectively in the following manner: first, obtaining the positioning signal of each satellite from the positioning signals of the constellation; next, determining the satellite elevation of each satellite correspondingly based on the positioning signal of each satellite; finally, determining an average value of the satellite elevations of the plurality of satellites in the constellation as the average satellite elevation of the corresponding constellation.

In a possible embodiment, the carrier noise density value of each constellation may be determined respectively in the following manner: first, obtaining the positioning signal of each satellite from the positioning signals of the constellation; next, determining the carrier noise density value of each satellite correspondingly based on the positioning signal of each satellite; finally, obtaining N carrier noise density values maximum among the carrier noise density values of each satellite, and determining an average value of the N carrier noise density values as the carrier noise density value of the constellation. N is a preset first quantity value, and N is greater than or equal to 1.

In step S103, the terminal equipment is controlled to stop receiving the positioning signal transmitted by the constellation, the quality parameter of which meets the preset condition in the at least one constellation.

If the average satellite elevation of each constellation is determined in step S102, the terminal equipment may be controlled to stop receiving the positioning signal of the constellation in which the average satellite elevation meets the preset condition in the at least one constellation in this step. For example, the terminal equipment is controlled to stop receiving the positioning signal of the constellation the average satellite elevation of which is less than a preset elevation threshold (for example, 40°). This is because the positioning signal transmitted by the constellation with smaller average satellite elevation are easy to be blocked or interfered, so the quality is poorer. Therefore, stop receiving the positioning signal of these constellations, so as to ensure the higher quality of the received positioning signal.

If the carrier noise density value of each constellation is determined in step S102, the terminal equipment may be controlled to stop receiving the positioning signal of the constellation in which the carrier noise density value meets the preset condition in the at least one constellation in this step. For example, the terminal equipment is controlled to stop receiving the positioning signal of the constellation the carrier noise density value of which is less than a preset first density threshold (for example, 30 dB Hz). This is because the signal strength of the positioning signal transmitted by the constellation with smaller carrier noise density value is weaker. Therefore, stop receiving the positioning signal of this part of the constellation, so as to ensure the stronger strength of the received positioning signal.

If the number of satellites of each constellation is determined in step S102, the terminal equipment may be controlled to stop receiving the positioning signal of the constellation in which the number of satellites meets the preset condition in the at least one constellation in this step. For example, the terminal equipment is controlled to stop receiving the positioning signal transmitted by the constellation the number of satellites of which is less than a first number threshold (for example, 8).

If the average satellite elevation and the carrier noise density value of each constellation are determined in step S102, the terminal equipment may be controlled to stop receiving the positioning signal of the constellation, in which the average satellite elevation meets the preset condition or the carrier noise density value meets the preset condition in this step. For example, the terminal equipment is controlled to stop receiving the positioning signal of the constellation in which the average satellite elevation is less than the preset elevation threshold (for example, 40°), or the carrier noise density value is less than the preset first density threshold (for example, 30 dB Hz).

If the average satellite elevation and the carrier noise density value of each constellation are determined in step S102, the terminal equipment may be controlled to stop receiving the positioning signal of the constellation in which the average satellite elevation meets the preset condition and the carrier noise density value meets the preset condition in this step. For example, the terminal equipment is controlled to stop receiving the positioning signal of the constellation in which the average satellite elevation is less than the preset elevation threshold (for example, 40°), and the carrier noise density value is less than the preset first density threshold (for example, 30 dB Hz).

If the average satellite elevation and the number of satellites of each constellation are determined in step S102, the terminal equipment may be controlled to stop receiving the positioning signal of the constellation in which the average satellite elevation meets the preset condition or the number of satellites meets the preset condition in this step. For example, the terminal equipment is controlled to stop receiving the positioning signal transmitted by the constellation in which the average satellite elevation is less than the preset elevation threshold (for example, 40°), or the number of satellites is less than the first number threshold (for example, 8).

If the average satellite elevation and the number of satellites of each constellation are determined in step S102, the terminal equipment may be controlled to stop receiving the positioning signal of the constellation in which the average satellite elevation meets the preset condition and the number of satellites meets the preset condition in this step. For example, the terminal equipment is controlled to stop receiving the positioning signal transmitted by the constellation in which the average satellite elevation is less than the preset elevation threshold (for example, 40°) and the number of satellites is less than the first number threshold (for example, 8).

If the carrier noise density value and the number of satellites of each constellation are determined in step S102, the terminal equipment may be controlled to stop receiving the positioning signal of the constellation in which the carrier noise density value meets the preset condition or the number of satellites meets the preset condition in this step. For example, the terminal equipment is controlled to stop receiving the positioning signal transmitted by the constellation in which the carrier noise density value is less than the preset first density threshold (for example, 30 dB Hz), or the number of satellites is less than the first number threshold (for example, 8).

If the carrier noise density value and the number of satellites of each constellation are determined in step S102, the terminal equipment may be controlled to stop receiving the positioning signal of the constellation in which the carrier noise density value meets the preset condition and the number of satellites meets the preset condition in this step. For example, the terminal equipment is controlled to stop receiving the positioning signal transmitted by the constellation in which the carrier noise density value is less than the preset first density threshold (for example, 30 dB Hz) and the number of satellites is less than the first number threshold (for example, 8).

If the average satellite elevation, the carrier noise density value and the number of satellites of each constellation are determined in step S102, the terminal equipment may be controlled to stop receiving the positioning signal transmitted by the constellation in which the average satellite elevation meets the preset condition, the carrier noise density value meets the preset condition, or the number of satellites meets the preset condition in this step. For example, the terminal equipment is controlled to stop receiving the positioning signal transmitted by the constellation in which the average satellite elevation is less than the preset elevation threshold, the carrier noise density value is less than the preset first density threshold, or the number of satellites is less than the first number threshold.

If the average satellite elevation, the carrier noise density value and the number of satellites of each constellation are determined in step S102, the terminal equipment may be controlled to stop receiving the positioning signal transmitted by the constellation in which the average satellite elevation meets the preset condition, the carrier noise density value meets the preset condition and the number of satellites meets the preset condition in this step. For example, the terminal equipment is controlled to stop receiving the positioning signal transmitted by the constellation in which the average satellite elevation is less than the preset elevation threshold, the carrier noise density value is less than the preset first density threshold, and the number of satellites is less than the first number threshold.

The constellation that stops receiving satellite signals may be added to the blacklist, so that the satellite signals of the constellation in the blacklist may no longer be searched during the process of terminal equipment searching for satellite signals, so as to reduce power consumption.

It may be understood that the average satellite elevation and/or the carrier noise density values of each constellation are not fixed, so the constellation that stops receiving satellite signals may be updated in real time (for example, the blacklist above may be updated in real time), but this will cause the calculation and judgment process in the above steps to run in real time and the power consumption to increase. Therefore, a preset duration (such as 10 min, 20 min, etc.) may be set. Then, in this step, the terminal equipment is controlled to stop receiving the positioning signal transmitted by the constellation in which the quality parameter meets the preset condition in the at least one constellation within the preset duration. That is to say, the positioning signal of the constellation determined in the judgment result is continuously stopped receiving for the preset duration, so as to avoid the increase of energy consumption caused by frequent judgment of the constellation that stops receiving the satellite signals. After the preset duration, the constellation that stops receiving the positioning signal may be determined again according to the above steps (i.e. the blacklist may be determined again). That is, the positioning signal of at least one constellation may be received again, and the quality parameter of each constellation in the at least one constellation may be determined correspondingly based on the positioning signal of the at least one constellation, and the constellation in which the quality parameter meets the preset condition may be determined, so as to ensure the positioning accuracy.

It may be understood that the priority of each constellation may be set in advance. If the judgment result of this step is that the quality parameter of each constellation in the at least one constellation meets the preset condition, the receiving of one or more constellations with the highest priority may not be stopped in this step, so as to ensure that the execution of this step will not affect the positioning accuracy. For example, if the priority of the five constellations GPS, BDS, GLONASS, Galileo and NAVIC is reduced in turn, when the quality parameter of each constellation meets the preset condition, it is possible to stop receiving the positioning signal transmitted by the three constellations GLONASS, Galileo and NAVIC without stopping receiving the positioning signal transmitted by the two constellations GPS and BDS.

By receiving the positioning signal of at least one constellation, the present disclosure may correspondingly determine the quality parameter of each constellation in the at least one constellation based on the positioning signal of the at least one constellation, then judge whether the quality parameter of each constellation in the at least one constellation meets the preset condition, and control the terminal equipment to stop receiving the positioning signal of the constellation in which the quality parameter meets the preset condition in the at least one constellation. By means of judging whether the constellation meets the condition for stopping receiving the positioning signal with the quality parameter, it is possible to stop receiving the positioning signal of some constellations, so as to reduce the power consumption of search positioning signal, avoid large power consumption of the terminal equipment caused by positioning services, and then extend the endurance of the terminal equipment to avoid affecting other functions of the terminal equipment.

In some embodiments of the present disclosure, the execution condition of step S103 in the positioning method shown in FIG. 1 may be set, so that this step may be executed when the execution condition is met to reduce the power consumption caused by the positioning service, while ensuring that the execution of this step will not affect the positioning accuracy. That is because the execution of step S103 will reduce the positioning signal received by the terminal equipment.

In a possible embodiment, a first execution condition is set, that is, the quality parameter of each constellation in the at least one constellation is determined based on the positioning signal of the at least one constellation in step S102. Specifically, the quality parameter of each positioning signal in all positioning signals are determined based on all received positioning signal; then, when the quality parameter of all positioning signals received by the terminal equipment meets the preset condition, this step is executed, that is, the step of controlling the terminal equipment to stop receiving the transmitted positioning signal of the constellation in the at least one constellation in which the quality parameter meets the preset condition is executed.

The quality parameter in the execution condition may include at least one of the number of satellites and the carrier noise density value. That is, only the number of satellites of all positioning signals may be determined; only the carrier noise density values of all positioning signals may be determined; both the number of satellites of all positioning signals and the carrier noise density values of all positioning signals may be determined. For example, the number of satellites corresponding to all the positioning signals may be determined based on all the received positioning signals; then, when the number of satellites is greater than a preset second number threshold (for example, 60), the carrier noise density value of the positioning signal of each satellite in all the positioning signals is determined; finally, the m carrier noise density values maximum (for example, 50% of the above second number threshold) among the carrier noise density values of the positioning signal of each satellite are obtained, and the average value of the M carrier noise density values is determined as the carrier noise density value corresponding to all the positioning signals, where M is the preset second number value, and M is greater than or equal to 1.

If the number of satellites of all positioning signals is determined, step S103 in the positioning method shown in FIG. 1 may be executed when the number of satellites of all positioning signals meets the preset condition. For example, when the number of satellites is greater than the preset second number threshold (for example, 60), step S103 in the positioning method shown in FIG. 1 is executed.

If the carrier noise density values of all the positioning signals are determined, step S103 in the positioning method shown in FIG. 1 may be executed when the carrier noise density values of all the positioning signals meet the preset condition. For example, when the carrier noise density value is greater than a preset second density threshold (for example, 35 dB Hz), step S103 in the positioning method shown in FIG. 1 is executed.

If both the number of satellites of the positioning signal and the carrier noise density value of the positioning signal are determined, step S103 in the positioning method shown in FIG. 1 may be executed when the number of satellites and the carrier noise density value of the positioning signal meets the preset condition. For example, step S103 in the positioning method shown in FIG. 1 may be executed when the number of satellites is greater than the preset second number threshold and the carrier noise density value is greater than the preset second density threshold.

By means of the judgment of the execution condition of step S103 in this embodiment, the positioning accuracy of the positioning method shown in FIG. 1 may be avoided from being affected.

In a possible embodiment, a second execution condition is set, and whether the terminal equipment meets the execution condition is determined in the following manner: when the remaining power of the terminal equipment is less than or equal to a preset power threshold (such as, 40%, 60%, etc.), this step is executed. That is, the step of controlling the terminal equipment to stop receiving the positioning signal transmitted by the constellation in which the quality parameter meets the preset condition in the at least one constellation is executed.

By means of the judgement of the startup condition in this embodiment, step S103 in the positioning method shown in FIG. 1 may be used to reduce the power consumption of the positioning service when the terminal equipment is of low power. Because, when the power of the terminal equipment is higher, the demand for power saving is lower, and when the power of the terminal equipment is lower, the demand for power saving is higher.

In some embodiments of the present disclosure, step S102 in the positioning method shown in FIG. 1 may be executed when the residual power of the terminal equipment is greater than the preset power threshold (for example, 40%, 60%, etc.), so as to determine the quality parameter of each constellation, so that step S103 may be executed according to the quality parameter of each constellation to reduce the power consumption caused by the positioning service. Because, step S102 is an operation of calculating parameter, which will consume more power of the terminal equipment, so it is unreasonable to adopt this power consumption step to achieve the purpose of power saving.

Correspondingly, in some examples, when the remaining power of the terminal equipment is less than or equal to the preset power threshold (for example, 40%, 60%, etc.), the terminal equipment may be controlled to stop receiving the preset high-frequency positioning signal in each constellation; and/or, when the remaining power of the terminal equipment is less than or equal to the preset power threshold, terminal equipment may be controlled to stop receiving the positioning signal transmitted by the pre-marked auxiliary constellation in the at least one constellation.

Each constellation may transmit positioning signal of multi frequencies. Since receiving high-frequency positioning signal consumes more power than receiving low-frequency positioning signal, it is possible to prohibit receiving higher frequency positioning signal (the frequency is preset, that is, the high-frequency positioning signal) when the power is lower, and directly receive lower frequency positioning signal, so as to reduce the power consumption. The positioning signal of multi frequencies transmitted by each constellation is well known in the art, so the preset high-frequency positioning signal in each constellation may be preset. That is, at least one higher frequency positioning signal being able to be received by each constellation may be marked as the preset high-frequency signal of the corresponding constellation. For example, the positioning signal transmitted by GPS constellation includes L1 frequency band and L5 frequency band. The frequency of L5 frequency band is higher than that of L1 frequency band. Therefore, it is possible to stop receiving the positioning signal of L5 frequency band of GPS constellation and receive the positioning signal of L1 frequency band. The positioning signal transmitted by BDS constellation includes B1 band and B2a band. The frequency of B2a band is higher than that of B1 band. Therefore, it is possible to stop receiving the positioning signal of B2a band of BDS constellation and receive the positioning signal of B1 band. The positioning signal transmitted by Galileo constellation includes E1 band and E5a band. The frequency of E5a band is higher than that of E1 band. Therefore, it is possible to stop receiving the positioning signal of E5a band of Galileo constellation and receive the positioning signal of E1 band.

The pre-marked auxiliary constellation may be part of all the constellations supported by the positioning service of the terminal equipment, and the auxiliary constellation is the constellation with poorer signal in all the constellations. For example, among the five constellations of GPS, BDS, GLONASS, Galileo and NAVIC, GLONASS, Galileo and NAVIC may be marked as auxiliary constellations in advance.

It may be understood that steps S102 to 103 shown in FIG. 1 and stopping receiving the preset high-frequency positioning signal or the positioning signal transmitted by the pre-marked auxiliary constellation in the above embodiments may be two power saving modes, which reduce the power consumption of the positioning service in different ways. When the power is higher than the power threshold, the power saving mode shown in FIG. 1 maybe adopted, that is, the quality parameter of each constellation are determined by means of step S102, and the positioning signal of some constellations are stopped receiving to reduce the electric quantity consumption based on the quality parameter of each constellation by means of step S103. When the remaining power is lower than or equal to the power threshold, the power saving mode of stopping receiving the preset high-frequency signal and/or the positioning signal transmitted by the auxiliary constellation may be adopted. This mode may be directly implemented without calculation and will not increase the power consumption of the terminal equipment.

In some embodiments of the present disclosure, a complete process of positioning and navigation using the positioning method for a smart phone is provided for example.

First, the mobile phone opens the GNSS satellite positioning service and starts the map software for positioning and navigation. At this time, the mobile phone receives the positioning signal of at least one constellation and uses the received positioning signal for positioning and navigation to display the positioning and navigation results to the user via the map software.

Then, whether the remaining power of the mobile phone is greater than 40% is judged. If the remaining power is less than or equal to 40%, the preset high-frequency positioning signal in the positioning signals of each constellation are stopped receiving, and/or the positioning signal transmitted by the pre-marked auxiliary constellation is stopped receiving, so as to save power by means of the above simple modes in the case of low power.

Next, if the remaining power is greater than 40%, the quality parameter of each constellation is determined based on the above received positioning signal of at least one constellation, and whether the quality parameter of each constellation meets the preset condition is judged. If there are no constellations with the quality parameter meeting the preset condition, the positioning signals of these constellations are continued to be received; If there are constellations with the quality parameter meeting the preset condition, the constellations with quality parameter meeting the preset condition are added to the blacklist, and the quality parameters of all the above received positioning signals are determined. If the quality parameters of all the positioning signals do not meet the preset condition, the positioning signals of these constellations are continued to be received. If the quality parameter of all positioning signals meets the preset condition, the positioning signals transmitted by the constellations in the blacklist are stopped receiving within the preset period, and the blacklist are updated again according to the above steps after the preset period.

According to the second aspect of the embodiment of the present disclosure, there is provided a positioning device applied to a terminal equipment. Referring to FIG. 2, the device includes:

a receiving module 201, configured to receive a positioning signal of at least one constellation;

a determination module 202, configured to determine a quality parameter of each constellation of the at least one constellation correspondingly based on the positioning signal of the at least one constellation;

a control module 203, configured to control the terminal equipment to stop receiving the positioning signal transmitted by the constellation of the at least one constellation, where the quality parameter of the constellation meets a preset condition.

In some embodiments of the present disclosure, the quality parameter includes satellite elevation, and each constellation includes a plurality of satellites.

The determination module is specifically configured to:

obtain the positioning signal of each satellite from the positioning signals of the constellation;

determine the satellite elevation of each satellite correspondingly based on the positioning signal of each satellite;

determine the satellite elevation of the corresponding constellation based on the satellite elevations of the plurality of satellites in the constellation.

In some embodiments of the present disclosure, the quality parameter includes a carrier noise density value, and each constellation includes a plurality of satellites.

The determination module is specifically configured to:

obtain the positioning signal of each satellite from the positioning signals of the constellation;

determine the carrier noise density value of each satellite correspondingly based on the positioning signal of each satellite;

obtain N carrier noise density values maximum among the carrier noise density values of the plurality of satellites in the constellation, and determine an average value of the N carrier noise density values as the carrier noise density value of the constellation, where N is a preset first quantity value, and N is greater than or equal to 1.

In some embodiments of the present disclosure, the quality parameter includes at least one of satellite elevation, carrier noise density value and number of satellites.

The control module is specifically configured to:

control the terminal equipment to stop receiving the positioning signal transmitted by the constellation, with the satellite elevation being less than a preset elevation threshold, and/or the carrier noise density value being less than a preset first density threshold, and/or the number of satellites being less than a first number threshold.

In some embodiments of the present disclosure, the control module is specifically configured to:

re-receive the positioning signal of the at least one constellation after a preset duration, determine the quality parameter of each constellation in the at least one constellation correspondingly based on the positioning signal of the at least one constellation, and determine the constellation with the quality parameter meeting the preset condition.

In some embodiments of the present disclosure, the determination module is specifically configured to:

determine the quality parameter of each positioning signal in all positioning signals correspondingly based on the all positioning signals received;

execute the step of controlling the terminal equipment to stop receiving the positioning signal transmitted by the constellation of the at least one constellation, when the quality parameter of the constellation meets the preset condition, in the condition that the quality parameter of all the positioning signals received by the terminal equipment meets the preset condition.

In some embodiments of the present disclosure, the quality parameter includes a carrier noise density value.

When the determination module is configured to determine the quality parameter of each positioning signal in all positioning signals based on the all positioning signals received, the determination module is specifically configured to:

determine a number of satellites corresponding to the all positioning signals based on the all positioning signals received;

determine the carrier noise density value of the positioning signal from each satellite in the all positioning signals in the condition that the number of satellites is greater than a preset second number threshold;

obtain M carrier noise density values maximum among the carrier noise density values of the positioning signal of each satellite, and determine an average value of the M carrier noise density values as the carrier noise density value corresponding to the all positioning signals, where M is a preset second quantity value, and M is greater than or equal to 1.

In some embodiments of the present disclosure, the quality parameter includes the carrier noise density value and the number of satellites. When the determination module is configured to execute the step of controlling the terminal equipment to stop receiving the positioning signal transmitted by the constellation of the at least one constellation, in case that the quality parameter of the constellation meets the preset condition, in the condition that the quality parameter of the all positioning signals received by the terminal equipment meets the preset condition, the determination module is specifically configured to:

execute the step of controlling the terminal equipment to stop receiving the positioning signal transmitted by the constellation of the at least one constellation, where the quality parameter of the constellation meets the preset condition, in the condition that the number of satellites is greater than a preset third number threshold and the carrier noise density value is greater than a preset second density threshold.

In some embodiments of the present disclosure, the determination module is specifically configured to:

determine the quality parameter of each constellation in the at least one constellation correspondingly based on the positioning signal of the at least one constellation, in case that the remaining power of the terminal equipment is greater than a preset power threshold.

In some embodiments of the present disclosure, the control module is specifically configured to:

control the terminal equipment to stop receiving the positioning signal transmitted by the constellation of the at least one constellation, where the quality parameter of the constellation meets the preset condition, in the condition that remaining power of the terminal equipment is less than or equal to a preset power threshold.

In some embodiments of the present disclosure, a power saving module is further included, configured to:

control the terminal equipment to stop receiving preset high-frequency positioning signal in the positioning signal transmitted by each constellation in the condition that remaining power of the terminal equipment is less than or equal to the preset power threshold; and/or control the terminal equipment to stop receiving the positioning signal transmitted by pre-marked auxiliary constellation in the at least one constellation, in the condition that remaining power of the terminal equipment is less than or equal to a preset power threshold.

As for the device in the above embodiment, the specific operation mode of each module has been described in detail in the embodiment of the method in the first aspect, and will not be described in detail here.

According to the third aspect of the embodiment of the present disclosure, referring to FIG. 3, an exemplary block diagram of an electronic equipment is shown. For example, the device 300 may be a mobile phone, a computer, a digital broadcasting terminal, a messaging device, a game console, a tablet device, a medical device, a fitness device, a personal digital assistant, and the like.

Referring to FIG. 3, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls the overall operation of the device 300, such as operations associated with display, telephone call, data communication, camera operation, and recording operation. The processing component 302 may include one or more processors 320 to execute instructions to complete all or part of the steps of the method described above. In addition, the processing component 302 may include one or more modules to facilitate interaction between the processing component 302 and other components. For example, the processing component 302 may include a multimedia module to facilitate interaction between the multimedia component 308 and the processing component 302.

The memory 304 is configured to store various types of data to support operations at the device 300. Examples of these data include instructions for any application or method operated on the device 300, contact data, phonebook data, messages, pictures, videos, and the like. The memory 304 may be implemented by any type of volatile or nonvolatile storage device or their combination, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power component 306 provides power to various components of the device 300. The power component 306 may include a power management system, one or more power supplies, and other components associated with generating, managing, and distributing power to the device 300.

The multimedia component 308 includes a screen providing an output interface between the device 300 and the user. In some embodiments, the screen may include a liquid crystal display (LCD) and a touch panel (TP). If the screen includes a touch panel, the screen may be implemented as a touch screen to receive an input signal from the user. The touch panel includes one or more touch sensors to sense touch, sliding and gestures on the touch panel. The touch sensor may not only sense the boundary of the touch or sliding operation, but also detect the duration and pressure related to the touch or sliding operation. In some embodiments, the multimedia component 308 includes a front camera and/or a rear camera. When the device 300 is in an operation mode, such as a shooting mode or a video mode, the front camera and/or the rear camera may receive external multimedia data. Each front camera and rear camera may be a fixed optical lens system or be of focal length and optical zoom capability.

The audio component 310 is configured to output and/or input audio signals. For example, the audio component 310 includes a microphone (MIC) configured to receive an external audio signal when the device 300 is in an operating mode, such as a call mode, a recording mode, and a speech recognition mode. The received audio signal may be further stored in the memory 304 or transmitted via the communication component 316. In some embodiments, the audio component 310 further includes a speaker for outputting an audio signal.

The I/O interface 312 provides an interface between the processing component 302 and the peripheral interface module, which may be a keyboard, a click wheel, a button, etc. These buttons may include but are not limited to: home button, volume button, start button and lock button.

The sensor assembly 314 includes one or more sensors for providing status assessment of various aspects of the device 300. For example, the sensor assembly 314 may detect the open/close state of the device 300, the relative positioning of components, such as the display and keypad of the device 300. The sensor assembly 314 may also detect the position change of the device 300 or one component of the device 300, the presence or absence of the user's contact with the device 300, the orientation or acceleration/deceleration of the device 300, and the temperature change of the device 300. The sensor assembly 314 may also include a proximity sensor configured to detect the presence of nearby objects without any physical contact. The sensor assembly 314 may further include an optical sensor, such as a CMOS or CCD image sensor, for use in imaging applications. In some embodiments, the sensor assembly 314 may further include an acceleration sensor, a gyroscope sensor, a magnetic sensor, a pressure sensor, or a temperature sensor.

The communication component 316 is configured to facilitate wired or wireless communication between the device 300 and other devices. The device 300 may access a wireless network based on a communication standard, such as WiFi, 2G or 3G, 4G or 5g, or their combination. In one exemplary embodiment, the communication section 316 receives a broadcast signal or broadcast related information from an external broadcast management system via a broadcast channel. In an exemplary embodiment, the communication component 316 further includes a near-field communication (NFC) module to facilitate short-range communication. For example, the NFC module may be implemented based on radio frequency identification (RFID) technology, infrared data association (IrDA) technology, ultra wideband (UWB) technology, Bluetooth (BT) technology and other technologies.

In an exemplary embodiment, the device 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components for performing a positioning method for the above described electronic equipment.

In the fourth aspect, in an exemplary embodiment, the present disclosure further provides a non-transitory computer-readable storage medium including instructions, such as a memory 304 including instructions, which may be executed by the processor 320 of the device 300 to complete the positioning method of the electronic equipment. For example, the non-transitory computer-readable storage medium may be ROM, random access memory (RAM), CD-ROM, magnetic tape, floppy disk, optical data storage device, etc.

After considering the description and practicing the disclosure disclosed herein, it is easy for those skilled in the art to think of other embodiments of the disclosure. The application aims to cover any variant, use or adaptive change of the disclosure, which follows the general principles of the disclosure and includes the common general knowledge or frequently used technical means in the technical field not disclosed in the disclosure. The description and the embodiments are regarded as examples, and the true scope and spirit of the present disclosure are indicated by the following claims.

It may be understood that the present disclosure is not limited to the precise structure already described above and shown in the drawings, and various modifications and changes may be made without departing from its scope. The scope of the present disclosure is limited by the appended claims.

In order to overcome the problems existing in the related technologies, the embodiments of the present disclosure provide a positioning method, a device, an electronic equipment and a storage medium to overcome the defects in the related technologies.

According to a first aspect of the embodiments of the present disclosure, provided is a positioning method applied to a terminal equipment, including:

receiving a positioning signal of at least one constellation;

determining a quality parameter of each constellation of the at least one constellation correspondingly based on the positioning signal of the at least one constellation;

controlling the terminal equipment to stop receiving the positioning signal transmitted by a constellation, among the at least one constellation, with the quality parameter of the constellation meeting a preset condition.

In one embodiment, the quality parameter includes a satellite elevation, each constellation includes a plurality of satellites;

the determining the quality parameter of each constellation of the at least one constellation correspondingly based on the positioning signal of the at least one constellation includes:

obtaining the positioning signal of each satellite from the positioning signal of the constellation;

determining the satellite elevation of each satellite correspondingly based on the positioning signal of each satellite;

determining the satellite elevation of the corresponding constellation based on the satellite elevations of the plurality of satellites in the constellation.

In one embodiment, the quality parameter includes a carrier noise density value, each constellation includes a plurality of satellites;

the determining the quality parameter of each constellation of the at least one constellation correspondingly based on the positioning signal of the at least one constellation includes:

obtaining the positioning signal of each satellite from the positioning signal of the constellation;

determining the carrier noise density value of each satellite correspondingly based on the positioning signal of each satellite;

obtaining N carrier noise density values maximum among the carrier noise density values of the plurality of satellites in the constellation, and determining an average value of the N carrier noise density values as the carrier noise density value of the constellation, where N is a preset first quantity value, and N is greater than or equal to 1.

In one embodiment, the quality parameter includes at least one of a satellite elevation, a carrier noise density value and a number of satellites;

the controlling the terminal equipment to stop receiving the positioning signal transmitted by the constellation, among the at least one constellation, with the quality parameter of the constellation meeting the preset condition, includes:

controlling the terminal equipment to stop receiving the positioning signal transmitted by the constellation, with the satellite elevation being less than a preset elevation threshold; and/or the carrier noise density value being less than a preset first density threshold; and/or the number of satellites being less than a first number threshold.

In one embodiment, after controlling the terminal equipment to stop receiving the positioning signal of the constellation of the at least one constellation, where the quality parameter of the constellation meets the preset condition, the positioning method further includes:

re-receiving the positioning signal of the at least one constellation after a preset duration, determining the quality parameter of each constellation in the at least one constellation correspondingly based on the positioning signal of the at least one constellation, and determining the constellation with the quality parameter meeting the preset condition.

In one embodiment, the determining the quality parameter of each constellation of the at least one constellation correspondingly based on the positioning signal of the at least one constellation, includes:

determining the quality parameter of each positioning signal in all positioning signals correspondingly based on the all positioning signals received;

executing the step of controlling the terminal equipment to stop receiving the positioning signal transmitted by the constellation, among the at least one constellation, with the quality parameter of the constellation meeting the preset condition, in the condition that the quality parameter of the all positioning signals received by the terminal equipment meets the preset condition.

In one embodiment, the quality parameter includes a carrier noise density value;

the determining the quality parameter of each positioning signal in all positioning signal correspondingly based on the all positioning signals received, includes:

determining a number of satellites corresponding to the all positioning signals based on the all positioning signals received;

determining the carrier noise density value of the positioning signal from each satellite in the all positioning signals in the condition that the number of satellites is greater than a preset second number threshold;

obtaining M carrier noise density values maximum among the carrier noise density values of the positioning signal of each satellite, and determining an average value of the M carrier noise density values as the carrier noise density value corresponding to the all positioning signals, where M is a preset second quantity value, and M is greater than or equal to 1.

In one embodiment, the quality parameter includes a carrier noise density value and a number of satellites; the executing the step of controlling the terminal equipment to stop receiving the positioning signal transmitted by the constellation, among the at least one constellation, with the quality parameter of the constellation meeting the preset condition, in the condition that the quality parameter of the all positioning signals received by the terminal equipment meets the preset condition, includes:

executing the step of controlling the terminal equipment to stop receiving the positioning signal transmitted by the constellation, among the at least one constellation, with the quality parameter of the constellation meeting the preset condition, in the condition that the number of satellites is greater than a preset third number threshold and the carrier noise density value is greater than a preset second density threshold.

In one embodiment, the determining the quality parameter of each constellation of the at least one constellation correspondingly based on the positioning signal of the at least one constellation includes:

determining the quality parameter of each constellation of the at least one constellation correspondingly based on the positioning signal of the at least one constellation, in the condition that remaining power of the terminal equipment is greater than a preset power threshold.

In one embodiment, the controlling the terminal equipment to stop receiving the positioning signal transmitted by the constellation, among the at least one constellation, with the quality parameter of the constellation meeting the preset condition, includes:

controlling the terminal equipment to stop receiving the positioning signal transmitted by the constellation, among the at least one constellation, with the quality parameter of the constellation meeting the preset condition, in the condition that remaining power of the terminal equipment is less than or equal to a preset power threshold.

In one embodiment, the positioning method further includes:

controlling the terminal equipment to stop receiving preset high-frequency positioning signal in the positioning signal transmitted by each constellation in the condition that remaining power of the terminal equipment is less than or equal to the preset power threshold; and/or controlling the terminal equipment to stop receiving the positioning signal transmitted by pre-marked auxiliary constellation in the at least one constellation, in the condition that remaining power of the terminal equipment is less than or equal to a preset power threshold.

According to a second aspect of the embodiments of the present disclosure, provided is a positioning device applied to a terminal equipment, including:

a receiving module, configured to receive positioning signal of at least one constellation;

a determination module, configured to determine a quality parameter of each constellation of the at least one constellation correspondingly based on the positioning signal of the at least one constellation;

a control module, configured to control the terminal equipment to stop receiving the positioning signal transmitted by a constellation, among the at least one constellation, with the quality parameter of the constellation meeting a preset condition.

In one embodiment, the quality parameter includes a satellite elevation, each constellation includes a plurality of satellites;

the determination module is specifically configured to:

obtain the positioning signal of each satellite from the positioning signal of the constellation;

determine the satellite elevation of each satellite correspondingly based on the positioning signal of each satellite;

determine the satellite elevation of the corresponding constellation based on the satellite elevations of the plurality of satellites in the constellation.

In one embodiment, the quality parameter includes a carrier noise density value, each constellation includes a plurality of satellites;

the determination module is specifically configured to:

obtain the positioning signal of each of the satellites from the positioning signal of the constellation;

determine the carrier noise density value of each satellite correspondingly based on the positioning signal of each satellite;

obtain N carrier noise density values maximum among the carrier noise density values of the plurality of satellites in the constellation, and determine an average value of the N carrier noise density values as the carrier noise density value of the constellation, where N is a preset first quantity value, and N is greater than or equal to 1.

In one embodiment, the quality parameter includes at least one of a satellite elevation, a carrier noise density value and a number of satellites;

the control module is specifically configured to:

control the terminal equipment to stop receiving the positioning signal transmitted by the constellation, with the satellite elevation being less than a preset elevation threshold; and/or the carrier noise density value being less than a preset first density threshold; and/or the number of satellites being less than a first number threshold.

In one embodiment, the determination module is specifically configured to:

re-receive the positioning signal of the at least one constellation after a preset duration, determine the quality parameter of each constellation in the at least one constellation correspondingly based on the positioning signal of the at least one constellation, and determine the constellation with the quality parameter meeting the preset condition.

In one embodiment, the determination module is specifically configured to:

determine the quality parameter of each positioning signal in all positioning signals correspondingly based on the all positioning signals received;

execute the step of controlling the terminal equipment to stop receiving the positioning signal transmitted by the constellation, among the at least one constellation, with the quality parameter of the constellation meeting the preset condition, in the condition that the quality parameter of all positioning signals received by the terminal equipment meets the preset condition.

In one embodiment, the quality parameter includes a carrier noise density value;

in the condition that the determination module is configured to determine the quality parameter of each positioning signal in all positioning signals correspondingly based on the all positioning signals received, the determination module is specifically configured to:

determine a number of satellites corresponding to the all positioning signals based on the all positioning signals received;

determine the carrier noise density value of the positioning signal from each satellite in the all positioning signals in the condition that the number of satellites is greater than a preset second number threshold;

obtain M carrier noise density values maximum among the carrier noise density values of the positioning signal of each satellite, and determine an average value of the M carrier noise density values as the carrier noise density value corresponding to the all positioning signals, where M is a preset second quantity value, and M is greater than or equal to 1.

In one embodiment, the quality parameter includes a carrier noise density value and a number of satellites; in the condition that the determination module is configured to execute the step of controlling the terminal equipment to stop receiving the positioning signal transmitted by the constellation, among the at least one constellation, with the quality parameter of the constellation meeting the preset condition, in the condition that the quality parameter of the all positioning signals received by the terminal equipment meets the preset condition, the determination module is specifically configured to:

execute the step of controlling the terminal equipment to stop receiving the positioning signal transmitted by the constellation, among the at least one constellation, with the quality parameter of the constellation meeting the preset condition, in the condition that the number of satellites is greater than a preset third number threshold and the carrier noise density value is greater than a preset second density threshold.

In one embodiment, the determination module is specifically configured to:

determine the quality parameter of each constellation of the at least one constellation correspondingly based on the positioning signal of the at least one constellation, in the condition that remaining power of the terminal equipment is greater than a preset power threshold.

In one embodiment, the control module is specifically configured to:

control the terminal equipment to stop receiving the positioning signal transmitted by the constellation, among the at least one constellation, with the quality parameter of the constellation meeting the preset condition, in the condition that remaining power of the terminal equipment is less than or equal to a preset power threshold.

In one embodiment, the positioning device further includes a power saving module, configured to:

control the terminal equipment to stop receiving preset high-frequency positioning signal in the positioning signal transmitted by each constellation in the condition that remaining power of the terminal equipment is less than or equal to the preset power threshold; and/or control the terminal equipment to stop receiving the positioning signal transmitted by pre-marked auxiliary constellation in the at least one constellation, in the condition that remaining power of the terminal equipment is less than or equal to a preset power threshold.

According to a third aspect of the embodiments of the present disclosure, provided is an electronic equipment including a memory and a processor; where, the memory is configured to store computer instructions runnable on the processor; the processor is configured to execute the computer instructions based on the positioning method described in the first aspect.

According to a fourth aspect of the embodiments of the present disclosure, provided is a non-transitory computer readable storage medium on which computer programs are stored, where, the method described in the first aspect is implemented when the programs are executed by a processor.

The technical solution provided by the embodiments of the present disclosure may include the following beneficial effects:

In the present disclosure, by receiving the positioning signal of the at least one constellation, the quality parameter of each constellation in the at least one constellation may be determined correspondingly based on the positioning signal of the at least one constellation; whether the quality parameter of each constellation in the at least one constellation meets the preset condition may be judged, and the terminal equipment may be controlled to stop receiving the positioning signal of the constellation in the at least one constellation, where the quality parameter meets the preset condition. Receiving the positioning signal of some constellations may be stopped by judging whether the constellation meets the condition for stopping receiving the positioning signal with quality parameter, so as to reduce the power consumption of searching for positioning signal, avoiding large power consumption of terminal equipment caused by positioning services, and then extending the endurance of terminal equipment to avoid affecting other functions of terminal equipment.

What is claimed is:

1. A positioning method, comprising:

receiving, by a terminal equipment, a positioning signal of at least one constellation;

determining, by the terminal equipment, a quality parameter of the at least one constellation to which the positioning signal belongs correspondingly based on the positioning signal of the at least one constellation; and controlling the terminal equipment to stop receiving the positioning signal transmitted by a constellation, wherein the constellation is among the at least one constellation, and the quality parameter of the constellation meets a preset condition;

wherein the quality parameter comprises a satellite elevation, a carrier noise density value and a number of satellites; and the satellite elevation comprises an average satellite elevation, a median satellite elevation, or a maximum satellite elevation;

wherein controlling the terminal equipment to stop receiving the positioning signal transmitted by the constellation comprises at least one of following acts:

controlling the terminal equipment to stop receiving the positioning signal transmitted by the constellation, with the satellite elevation being less than a preset elevation threshold;

controlling the terminal equipment to stop receiving the positioning signal transmitted by the constellation, with the carrier noise density value being less than a preset first density threshold; and controlling the terminal equipment to stop receiving the positioning signal transmitted by the constellation, with the number of satellites being less than a first number threshold.

2. The positioning method according to claim 1, wherein each of the at least one constellation comprises a plurality of satellites; and wherein determining the quality parameter of the at least one constellation to which the positioning signal belongs correspondingly based on the positioning signal of the at least one constellation comprises:

obtaining the positioning signal of a satellite from the positioning signal of the at least one constellation;

determining the satellite elevation of the satellite correspondingly based on the positioning signal of the satellite; and determining the satellite elevation of the at least one constellation correspondingly based on the satellite elevations of the plurality of satellites in the at least one constellation.

3. The positioning method according to claim 1, wherein the at least one constellation comprises a plurality of satellites; and wherein determining the quality parameter of the at least one constellation to which the positioning signal belongs correspondingly based on the positioning signal of the at least one constellation comprises:

obtaining the positioning signal of a satellite from the positioning signal of the at least one constellation;

determining the carrier noise density value of the satellite correspondingly based on the positioning signal of the satellite; and obtaining N carrier noise density values maximum among the carrier noise density values of the plurality of satellites in the at least one constellation, and determining an average value of the N carrier noise density values as the carrier noise density value of the at least one constellation, wherein N is a preset first quantity value, and N is greater than or equal to 1.

4. The positioning method according to claim 1, wherein the positioning method further comprises:

re-receiving the positioning signal of the at least one constellation in response to determining that a preset duration ends;

determining the quality parameter of the at least one constellation to which the positioning signal belongs correspondingly based on the positioning signal of the at least one constellation; and determining the constellation with the quality parameter meeting the preset condition.

5. The positioning method according to claim 1, wherein determining the quality parameter of the at least one constellation to which the positioning signal belongs correspondingly based on the positioning signal of the at least one constellation comprises:

determining the quality parameter of the positioning signal in all positioning signals correspondingly based on the all positioning signals received; and executing the step of controlling the terminal equipment to stop receiving the positioning signal transmitted by the constellation, in response to determining that the quality parameter of the all positioning signals received by the terminal equipment meets the preset condition.

6. The positioning method according to claim 5, wherein determining the quality parameter of the positioning signal in all positioning signals correspondingly based on the all positioning signals received comprises:

determining a number of satellites corresponding to the all positioning signals based on the all positioning signals received;

determining the carrier noise density value of the positioning signal of a satellite in the all positioning signals in response to determining that the number of satellites is greater than a preset second number threshold; and obtaining M carrier noise density values maximum among the carrier noise density values of the positioning signal of the satellite, and determining an average value of the M carrier noise density values as the carrier noise density value corresponding to the all positioning signals, wherein M is a preset second quantity value, and M is greater than or equal to 1.

7. The positioning method according to claim 5, wherein executing the step of controlling the terminal equipment to stop receiving the positioning signal transmitted by the constellation, in response to determining that the quality parameter of the all positioning signals received by the terminal equipment meets the preset condition, comprises:

executing the step of controlling the terminal equipment to stop receiving the positioning signal transmitted by the constellation, among the at least one constellation, with the quality parameter of the constellation meeting the preset condition, in response to determining that the number of satellites is greater than a preset third number threshold and the carrier noise density value is greater than a preset second density threshold.

8. The positioning method according to claim 1, wherein determining the quality parameter of the at least one constellation to which the positioning signal belongs correspondingly based on the positioning signal of the at least one constellation comprises:

determining the quality parameter of the at least one constellation to which the positioning signal belongs correspondingly based on the positioning signal of the at least one constellation, in response to determining that remaining power of the terminal equipment is greater than a preset power threshold.

9. The positioning method according to claim 1, wherein controlling the terminal equipment to stop receiving the positioning signal transmitted by the constellation comprises:

controlling the terminal equipment to stop receiving the positioning signal transmitted by the constellation, among the at least one constellation, with the quality parameter of the constellation meeting the preset condition, in response to determining that remaining power of the terminal equipment is less than or equal to a preset power threshold.

10. The positioning method according to claim 1, further comprising at least one of following acts:

controlling the terminal equipment to stop receiving preset high-frequency positioning signal in the positioning signal transmitted by the constellation in response to determining that remaining power of the terminal equipment is less than or equal to a preset power threshold; or controlling the terminal equipment to stop receiving the positioning signal transmitted by pre-marked auxiliary constellation in the at least one constellation, in response to determining that remaining power of the terminal equipment is less than or equal to the preset power threshold.

11. An electronic equipment for receiving a positioning signal from a constellation, comprising a memory and a processor, wherein the memory is configured to store computer instructions runnable on the processor;

the processor is configured to perform following acts:

receiving a positioning signal of at least one constellation; determining a quality parameter of the at least one constellation to which the positioning signal belongs correspondingly based on the positioning signal of the at least one constellation;

controlling the terminal equipment to stop receiving the positioning signal transmitted by a constellation, wherein the constellation is among the at least one constellation, and the quality parameter of the constellation meets a preset condition;

wherein the quality parameter comprises a satellite elevation, a carrier noise density value and a number of satellites; and the satellite elevation comprises an average satellite elevation, a median satellite elevation, or a maximum satellite elevation;

wherein controlling the terminal equipment to stop receiving the positioning signal transmitted by the constellation comprises at least one of following acts:

controlling the terminal equipment to stop receiving the positioning signal transmitted by the constellation, with the satellite elevation being less than a preset elevation threshold;

controlling the terminal equipment to stop receiving the positioning signal transmitted by the constellation, with the carrier noise density value being less than a preset first density threshold; and controlling the terminal equipment to stop receiving the positioning signal transmitted by the constellation, with the number of satellites being less than a first number threshold.

12. The electronic equipment according to claim 11, wherein, each of the at least one constellation comprises a plurality of satellites; and wherein determining the quality parameter of the at least one constellation to which the positioning signal belongs correspondingly based on the positioning signal of the at least one constellation comprises:

obtaining the positioning signal of a satellite from the positioning signal of the at least one constellation;

determining the satellite elevation of the satellite correspondingly based on the positioning signal of the satellite; and determining the satellite elevation of the at least one constellation correspondingly based on the satellite elevations of the plurality of satellites in the at least one constellation.

13. The electronic equipment according to claim 11, wherein the at least one constellation comprises a plurality of satellites; and wherein determining the quality parameter of the at least one constellation to which the positioning signal belongs correspondingly based on the positioning signal of the at least one constellation comprises:

obtaining the positioning signal of a satellite from the positioning signal of the at least one constellation;

determining the carrier noise density value of the satellite correspondingly based on the positioning signal of the satellite; and obtaining N carrier noise density values maximum among the carrier noise density values of the plurality of satellites in the at least one constellation, and determining an average value of the N carrier noise density values as the carrier noise density value of the at least one constellation, wherein N is a preset first quantity value, and N is greater than or equal to 1.

14. The electronic equipment according to claim 11, wherein determining the quality parameter of the at least one constellation to which the positioning signal belongs correspondingly based on the positioning signal of the at least one constellation comprises:

determining the quality parameter of the positioning signal in all positioning signals correspondingly based on the all positioning signals received; and executing the step of controlling the terminal equipment to stop receiving the positioning signal transmitted by the constellation, among the at least one constellation, with the quality parameter of the constellation meeting the preset condition, in response to determining that the quality parameter of the all positioning signals received by the terminal equipment meets the preset condition.

15. The electronic equipment according to claim 14, wherein determining the quality parameter of the positioning signal in all positioning signals correspondingly based on the all positioning signals received, comprises:

determining a number of satellites corresponding to the all positioning signals based on the all positioning signals received;

determining the carrier noise density value of the positioning signal of a satellite in the all positioning signals in response to determining that the number of satellites is greater than a preset second number threshold; and obtaining M carrier noise density values maximum among the carrier noise density values of the positioning signal of the satellite, and determining an average value of the M carrier noise density values as the carrier noise density value corresponding to the all positioning signals of the at least one constellation, wherein M is a preset second quantity value, and M is greater than or equal to 1.

16. The electronic equipment according to claim 14, wherein executing the step of controlling the terminal equipment to stop receiving the positioning signal transmitted by the constellation in response to determining that the quality parameter of the all positioning signals received by the terminal equipment meets the preset condition, comprises:

executing the step of controlling the terminal equipment to stop receiving the positioning signal transmitted by the constellation, among the at least one constellation, with the quality parameter of the constellation meeting the preset condition, in response to determining that the number of satellites is greater than a preset third number threshold and the carrier noise density value is greater than a preset second density threshold.

17. The electronic equipment according to claim 14, wherein controlling the terminal equipment to stop receiving the positioning signal transmitted by the constellation, among the at least one constellation, with the quality parameter of the constellation meeting the preset condition, comprises:

controlling the terminal equipment to stop receiving the positioning signal transmitted by the constellation, among the at least one constellation, with the quality parameter of the constellation meeting the preset condition, in response to determining that remaining power of the terminal equipment is less than or equal to a preset power threshold.

18. A non-transitory computer readable storage medium having stored therein computer programs executed by a processor of an electronic equipment for receiving a positioning signal from a constellation to implement operations comprising:

receiving a positioning signal of at least one constellation;

determining a quality parameter of the at least one constellation to which the positioning signal belongs correspondingly based on the positioning signal of the at least one constellation; and controlling the terminal equipment to stop receiving the positioning signal transmitted by a constellation, wherein the constellation is among the at least one constellation, and the quality parameter of the constellation meets a preset condition;

wherein the quality parameter comprises at least one of a satellite elevation, a carrier noise density value and a number of satellites; and the satellite elevation comprises an average satellite elevation, a median satellite elevation, or a maximum satellite elevation;

wherein controlling the terminal equipment to stop receiving the positioning signal transmitted by the constellation comprises at least one of following acts:

controlling the terminal equipment to stop receiving the positioning signal transmitted by the constellation, with the satellite elevation being less than a preset elevation threshold;

controlling the terminal equipment to stop receiving the positioning signal transmitted by the constellation, with the carrier noise density value being less than a preset first density threshold; and controlling the terminal equipment to stop receiving the positioning signal transmitted by the constellation, with the number of satellites being less than a first number threshold.

\* \* \* \* \*